March 1, 1932. C. R. HUBBARD 1,847,216

PACKING

Filed March 31, 1928

INVENTOR
Cecil R. Hubbard,
By Attorneys,
Fraser, Myers & Manley.

Patented Mar. 1, 1932

1,847,216

UNITED STATES PATENT OFFICE

CECIL R. HUBBARD, OF PALMYRA, NEW YORK, ASSIGNOR TO THE GARLOCK PACKING COMPANY, OF PALMYRA, NEW YORK, A CORPORATION OF NEW YORK

PACKING

Application filed March 31, 1928. Serial No. 266,207.

This invention relates to improvements in machinery packing of the type adapted for use in the packing of piston rods and the like.

One object of the invention is to provide a packing member, or a packing of which such a member constitutes a part, which may be made in rectilinear form and then curved into the form of a helical coil of an approximate internal diameter corresponding with that of the piston in association with which it is intended to be used, and from which packing rings may be cut as desired.

The invention is peculiarly applicable to a packing having a core of soft metal or of other appropriate reinforcing material which may be readily bent to the desired curvature without destroying or impairing its sealing properties.

It is an important object of the invention to produce a packing of the above-described character having a continuous and unbroken wearing surface.

In the accompanying drawings illustrating the preferred and modified forms:—

Figure 1:
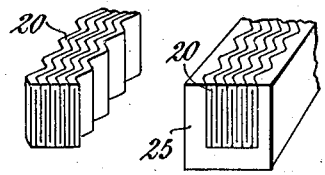
Figure 1 is a perspective view of a packing member constructed in accordance with the invention herein disclosed.
Figure 2:
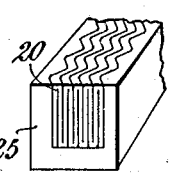
Fig. 2 is a perspective view of a short section of packing of which the member illustrated in Fig. 1 is used as a core.
Figure 3:
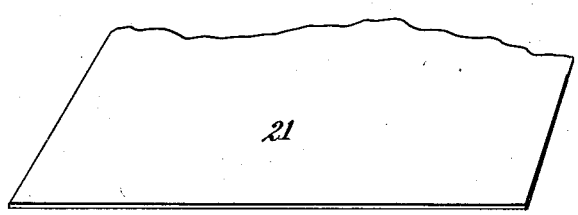
Fig. 3 is a perspective view of a short length of sheet material from which the member illustrated in Fig. 1 may be constructed.
Figure 4:
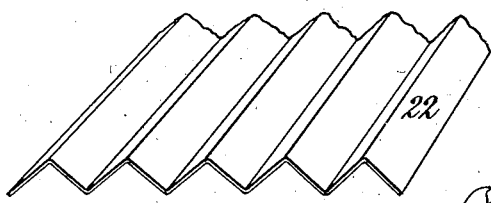
Fig. 4 is a perspective view of the piece of material illustrated in Fig. 3 bent to a zigzag cross-sectional form as a result of one step in the process of making the packing member.

Referring first to Figs. 1 to 5, inclusive, the invention comprises a laminated packing member which may be used alone or which may be combined with a backing to form a packing of the character of that illustrated in Fig. 2. This packing member or core element may be made of any suitable material and may be constructed in any appropriate manner. In the preferred form herein disclosed, the packing element 20 of Fig. 1 may be constructed from a single strip or ribbon 21 (Fig. 3) of lead, Babbitt metal, or other suitable soft metal.

Figure 5:
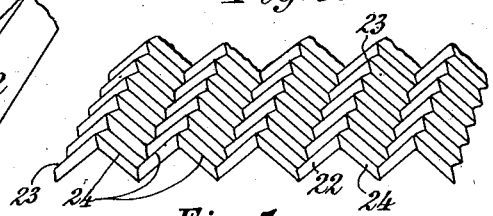
Fig. 5 is a perspective view of the strip illustrated in Fig. 4 after the elements have been crimped or bent to zigzag form in longitudinal section preparatory to having the elements closed upon themselves to form the packing member illustrated in Fig. 1.

In accordance with one satisfactory method of making the packing, the strip of metal 21 is first bent to a zigzag form in cross-section (Fig. 4), preferably by running the strip between rollers of appropriate form, thus subdividing it into a number of longitudinally-disposed elements 22, each inclined at an angle with respect to its neighboring element. As a result of the next step in the process, the partly formed packing element illustrated in Fig. 5 may be formed from that illustrated in Fig. 4 by bending or crimping each of the elements 22 (Fig. 4) into a zigzag form in cross-section as illustrated in Fig. 5. This may also be effected by passing the strip of material illustrated in Fig. 4 between rollers having teeth so related as to impart the desired form to the respective elements, and, in order to facilitate the closing of the folds of the strip illustrated in Fig. 5 to form the element illustrated in Fig. 1, it is important that the crimping or bending of the elements of Fig. 5 be such as to cause the crests 23 of the zigzag elements of each longitudinal strip to align with the hollows 24 of the zigzag elements of each adjacent strip. This relationship of the respective elements is such that the folds may be closed into the compact form illustrated in Fig. 1 with the crests and hollows of the respective longitudinal elements snugly nested one within another.

The packing member illustrated in Fig. 1 may be used as an independent element or it may be embedded in a backing 25 of friction fabric or other suitable material as indicated in Fig. 2. In either form the zigzag form of the strip renders it extremely flexible so that it may be readily bent from the rectilinear form illustrated in Figs. 1 and 2 to the curved form illustrated in Fig. 6. The relative distortion or change of form of the elements as a result of such bending is clearly indicated in Fig. 7, in which the zigzag elements are represented as being slightly closed up at their inner ends as at 26 and slightly opened at their outer ends as at 27. As a result of this flexibility due to the zigzag form of the elements of the packing member, a composite packing such as that illustrated in Fig. 2 may be bent to circular form without setting up any abnormal strains between the elements of the core and the elements of the backing, since the metal elements are adapted to yield and take the particular form best suited to conform with the distortions produced in the backing during the bending process.

Figure 8:
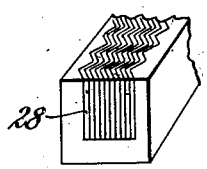
Fig. 8 is a perspective view of a packing having a modified form of core embodying the invention, said core comprising a number of separate elements instead of being made from a single sheet.

The modified form of packing illustrated in Fig. 8 differs from that illustrated in Fig. 2 only in that the zigzag reinforcing material comprises a number of separate elements nested one within the other, instead of a single element produced by bending a single sheet of material. The reinforcing elements 28 may be made of soft metal or any other appropriate material. The strips 28, if desired, may be secured together by stitching, or by the application of solder at intervals along the base of the core, or by spaced spots of solder between the contacting surfaces, or in any other suitable manner.

Figure 9:
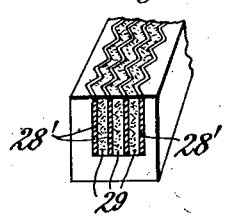
Fig. 9 is a like view of another modification of the invention comprising zigzag reinforcing elements of soft metal used in alternation with zigzag reinforcing elements of friction fabric or other analogous material.

The modified form of packing illustrated in Fig. 9 differs from that illustrated in Fig. 8 in that the alternate zigzag reinforcing elements are represented as being made of different material. For example, the elements 28' may be made of soft metal and the intervening members 29 may be made of some such material as friction fabric.

Figure 10:
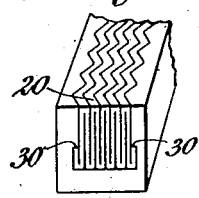
Fig. 10 is a perspective view of a packing the core of which embodies a second modified form of the invention including means specially designed to anchor the core within the backing.

The modified form of packing illustrated in Fig. 10 differs from that illustrated in Fig. 2 in that the outer elements of the core 20 are represented as terminating between the base of the core and the wearing face of the packing as at 30, so as to provide an anchor whereby the core may be more firmly embedded in the material of the backing.

Figure 6:
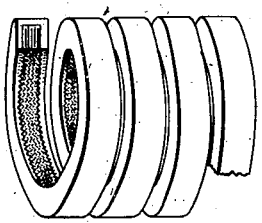
Fig. 6 is a conventional view of a coil of packing such as that illustrated in Fig. 2, after the same has been bent into helical form of an internal diameter substantially conforming with that of the rod in association with which it is intended to be used.
Figure 7:
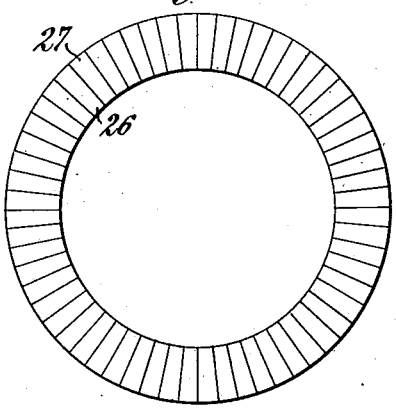
Fig. 7 is a side view of one of the elements of the packing member, illustrating the relative change of form of different parts of the element when bent from the rectilinear form of Fig. 2 to the curved form of Fig. 6.

From the foregoing description it will be apparent that packing constructed in accordance with the invention herein disclosed is adapted to present a continuous and uninterrupted surface which may be held in contact with a piston rod under uniform pressure at all points. When applied in the form of split rings arranged in a broken-joint relationship, the packing is adapted to establish a substantially perfect seal capable of standing up under heavy service even though subjected to widely varying differences of temperature, pressure, moisture, and chemical action. The packing may be economically manufactured from stock material and worked into finished rings of desired sizes, or may be put up in coils, as illustrated in Fig. 6, from which rings may be cut for use as desired.

The invention is not intended to be limited to the particular forms herein disclosed but should be regarded as covering modifications and variations thereof within the scope of the appended claims.

What I claim is:—

1. A laminated rod packing comprising layers of zigzag form disposed edgewise with respect to its wearing surface and having the crests of each layer nested in the hollows of an adjacent layer, the bends of the zigzag elements being perpendicular to the wearing face of the packing and the portions of the zigzag elements between successive bends being inclined in alternation towards its opposite sides, said packing comprising rectilinear strip material adapted to be readily bent to the curvature of a rod to be packed.

2. A laminated packing member substantially like that defined by claim 1, comprising zigzag layers of soft metal.

3. A laminated rod packing element comprising sheet material folded into a plurality of closed accordion plaits having the plaits disposed edgewise with respect to its wearing surface and bent to zigzag form, the bends of the zigzag elements being disposed at right angles to the bends of the plaits.

4. A laminated rod packing element comprising thin, shoft sheet-metal folded into a plurality of closed accordion plaits having the plaits disposed edgewise with respect to its wearing surface and bent to zigzag form, the bends of the zigzag elements being disposed at right angles to the bends of the plaits.

5. A packing comprising elements of zigzag form having the crests of one element nested in the hollows of an adjacent element, and a backing of flexible material within which it is embedded with edges of the zigzag elements exposed at its wearing face, the bends of the zigzag elements being disposed at right angles to the wearing face.

6. A packing comprising soft metal elements of zigzag form disposed edgewise with respect to its wearing surface and having the crests of one element nested in the hollows of an adjacent element, and a backing of reinforced plastic composition within which it is embedded with edges of the zigzag elements exposed at the wearing face, the bends of the zigzag elements being disposed at right angles to the wearing face.

7. A packing comprising the packing element defined by claim 3 having a backing of flexible material within which it is embedded with edges of zigzag folds exposed at its wearing face.

8. A packing comprising the packing element defined by claim 4 having a backing of reinforced plastic composition within which it is embedded with edges of zigzag folds exposed at its wearing face.

9. A packing comprising the packing element defined by claim 4 having its outermost folds at the base of the element and its outermost layers terminating intermediate the base and the wearing face, so as to serve as anchors, and a backing of reinforced plastic composition within which said element is embedded with said anchors buried beneath the surface and edges of zigzag folds exposed at the wearing face.

10. The method of making a packing element, which consists in bending a ribbon of thin soft metal into a zigzag form in cross-section, crimping each of the longitudinally-extending elements of the zigzag strip into zigzag form in longitudinal section, the zigzag elements of the longitudinal strips being so disposed that a crest of an element of one strip will be aligned with a hollow of an element of an adjacent strip, said crests and hollows being disposed at right angles to bends between the longitudinally-extending elements, and closing said elements to form a compact laminated mass with the crest of each zigzag element of each longitudinal strip nested snugly within the hollow of an element of a contiguous strip.

In witness whereof, I have hereunto signed my name.

CECIL R. HUBBARD.